United States Patent
Wang et al.

(10) Patent No.: US 8,749,872 B2
(45) Date of Patent: *Jun. 10, 2014

(54) ELECTROPHORETIC DISPLAY APPARATUS AND SPACING LAYER

(75) Inventors: Tzu-Ming Wang, Hsinchu (TW); Yi-Ching Wang, Hsinchu (TW); Jui-Chung Cheng, Hsinchu (TW); Kai-Cheng Chuang, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 258 days.

This patent is subject to a terminal disclaimer.

(21) Appl. No.: 13/227,351

(22) Filed: Sep. 7, 2011

(65) Prior Publication Data

US 2011/0317252 A1   Dec. 29, 2011

Related U.S. Application Data

(63) Continuation of application No. 12/487,706, filed on Jun. 19, 2009, now Pat. No. 8,035,887.

(51) Int. Cl.
*G02B 26/00* (2006.01)
*G09G 3/34* (2006.01)

(52) U.S. Cl.
USPC .................. 359/296; 345/107; 349/153

(58) Field of Classification Search
USPC .......... 359/296, 228, 245, 253; 345/105, 107; 349/86, 151, 153, 155, 156; 428/119, 428/189
See application file for complete search history.

(56) References Cited

U.S. PATENT DOCUMENTS

| | | | | |
|---|---|---|---|---|
| 6,674,503 | B2 * | 1/2004 | Niiya et al. | 349/155 |
| 6,829,070 | B2 * | 12/2004 | Adachi | 359/245 |
| 6,850,355 | B2 | 2/2005 | Liang et al. | |
| 7,145,628 | B2 * | 12/2006 | Sasaki | 349/190 |
| 7,202,992 | B2 | 4/2007 | Kawai | |
| 7,459,176 | B2 | 12/2008 | Sakurada | |
| 7,477,442 | B2 | 1/2009 | Iwamatsu et al. | |
| 7,715,089 | B2 | 5/2010 | Song | |
| 8,035,887 | B2 * | 10/2011 | Wang et al. | 359/296 |
| 8,363,304 | B2 * | 1/2013 | Tanaka | 359/296 |
| 2009/0068351 | A1 | 3/2009 | Ito et al. | |

FOREIGN PATENT DOCUMENTS

CN   101187768 A   5/2008

OTHER PUBLICATIONS

China Official Action Issued on Feb. 22, 2012.

* cited by examiner

*Primary Examiner* — Loha Ben
(74) *Attorney, Agent, or Firm* — Chun-Ming Shih

(57) ABSTRACT

An electrophoretic display apparatus includes a bottom substrate, an electrophoretic layer, a color filter substrate and a spacing layer. The bottom substrate has a drive circuitry layer, and the electrophoretic layer is disposed on the drive circuitry layer of the bottom substrate. The color filter substrate is disposed above the electrophoretic layer, and the spacing layer is disposed between the color filter substrate and the electrophoretic layer. The electrophoretic display apparatus has better display quality. A spacing layer is also provided.

17 Claims, 4 Drawing Sheets

ELECTROPHORETIC DISPLAY APPARATUS AND SPACING LAYER

CROSS-REFERENCE TO RELATED APPLICATIONS

This application is a continuation application of an application Ser. No. 12/487,706, filed on Jun. 19, 2009, now U.S. Pat. No. 8,035,887 and based upon and claims the benefit of priority from the prior Taiwanese Patent Application No. 098117546, filed May 26, 2009, the entirety of the above-mentioned patent application is hereby incorporated by reference herein and made a part of this specification.

BACKGROUND

1. Fields of the Invention

The present invention relates to a display apparatus, and particularly to an electrophoretic display apparatus and spacing layer.

2. Description of the Related Art

With the advancement of the flat display technology and due to the flat display apparatuses having advantages of light in weight, small in size and low power consuming, the flat display apparatuses have become more and more popular. In general, the flat display apparatuses include liquid crystal display (LCD) apparatuses, plasma display panel (PDP) apparatuses, organic light emitting diode (OLED) display apparatuses and electrophoretic display (EPD) apparatuses, etc., wherein the electrophoretic display apparatus does not include light emitting source, so the electrophoretic display apparatus further has the advantage of power saving in comparison with other flat display apparatuses.

The earlier electrophoretic display apparatus is a monochrome display apparatus, but to improve a market competitiveness of the electrophoretic display apparatus, a color filter substrate is used in conventional technique to enable the electrophoretic display apparatus to display color images. It's only in this way that the electrophoretic display apparatus can achieve color display capability.

FIG. 1 is a schematic view of a conventional electrophoretic display apparatus. Referring to FIG. 1, the conventional electrophoretic display apparatus 100 includes a bottom substrate 110, a front plane laminate 120 and a color filter substrate 130. The bottom substrate 110 has a drive circuitry layer 112, the front plane laminate 120 is disposed on the drive circuitry layer 112, and the color filter substrate 130 is disposed on the front plane laminate 120. Moreover, the drive circuitry layer 112 includes a plurality of pixel electrodes (not shown in FIG. 1). The front plane laminate 120 includes an electrophoretic layer 122 and a transparent electrode layer 124 disposed on the electrophoretic layer 122. The electrophoretic layer 122 includes a plurality of black charged particles 123$b$ and a plurality of white charged particles 123$w$, wherein the black charged particles 123$b$ and the white charged particles 123$w$ have different electrical properties. The white charged particles 123$w$ and the black charged particles 123$b$ in the electrophoretic layer 122 are driven toward different directions by changing electrical fields between the pixel electrodes and the transparent electrode layer 124, and such that the electrophoretic display apparatus 100 is capable of displaying different images.

Furthermore, the color filter substrate 130 includes a plurality of red photoresists 132$r$, a plurality of green photoresists 132$g$ and a plurality of blue photoresists 132$b$, and the photoresists 132$r$, 132$b$ and 132$g$ are separated by a black matrix 134. The red photoresist 132$r$, the green photoresist 132$g$ and the blue photoresist 132$b$ are respectively used to filter white light into red light, green light and blue light so as to enable the electrophoretic display apparatus 100 to display color images.

The color filter substrate 130 disposed on the front plane laminate 120 enables the electrophoretic display apparatus 100 to display color images. However, due to the front plane laminate 120 and the color filter substrate 130 being rigid substrates, air bubbles are easily produced during assembling the color filter substrate 130 with the front plane laminate 120. The air bubbles result in gaps existed between the front plane laminate 120 and the color filter substrate 130, so the color filter substrate 130 can not be flatly attached to the front plane laminate 120. Therefore, the display quality, or the yield, of the conventional electrophoretic display apparatus 100 is reduced.

BRIEF SUMMARY

The present invention provides an electrophoretic display apparatus having better display quality.

The present invention provides a spacing layer to improve display quality of a display apparatus.

To achieve at least one of the above-mentioned advantages, an embodiment of the present invention provides an electrophoretic display apparatus including a bottom substrate, an electrophoretic layer, a color filter substrate and a spacing layer. The bottom substrate has a drive circuitry layer, and the electrophoretic layer is disposed on the drive circuitry layer of the bottom substrate. The color filter substrate is disposed above the electrophoretic layer, and the spacing layer is disposed between the color filter substrate and the electrophoretic layer.

In an embodiment of the present invention, the spacing layer includes a sealant and a plurality of spacers. The spacers are disposed in an area surrounded by the sealant.

In an embodiment of the present invention, the spacers have spherical shapes or pillar shapes.

In an embodiment of the present invention, the spacers are formed on the color filter substrate. Moreover, material of the spacers can include photo resin.

In an embodiment of the present invention, the spacers include at least one of plastic spacers, glass spacers and silicon spacers.

In an embodiment of the present invention, lengths of the spacers along a predetermined direction are respectively between 1 micrometer and 7 micrometers, and the predetermined direction points to the color filter substrate from the bottom substrate.

In an embodiment of the present invention, the electrophoretic display apparatus further includes a transparent electrode layer disposed between the electrophoretic layer and the spacing layer.

In an embodiment of the present invention, the electrophoretic display apparatus is a microcapsule type electrophoretic display apparatus, a microcup type electrophoretic display apparatus or a liquid powder display apparatus.

In an embodiment of the present invention, the electrophoretic display apparatus is an active electrophoretic display apparatus or a passive electrophoretic display apparatus.

To achieve at least one of the above-mentioned advantages, an embodiment of the present invention provides an electrophoretic display apparatus comprising an electrophoretic layer, a spacing layer, and a bottom substrate with a drive circuitry layer. The spacing layer comprises a sealant and a plurality of spacers disposed in an area surrounded by the sealant.

To achieve at least one of the above-mentioned advantages, an embodiment of the present invention provides a spacing layer comprising a sealant and a plurality of spacers disposed in an area surrounded by the sealant.

In the electrophoretic display apparatus of the present invention, due to the spacing layer being disposed between the color filter substrate and the electrophoretic layer, a vacuum process for the spacing layer can be performed after the color filter substrate being assembled with the electrophoretic layer so as to eliminate the air bubbles between the color filter substrate and the electrophoretic layer. This prevents the display quality of the electrophoretic display apparatus from being reduced due to the air bubbles, and therefore, the electrophoretic display apparatus of the present invention has better display quality.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
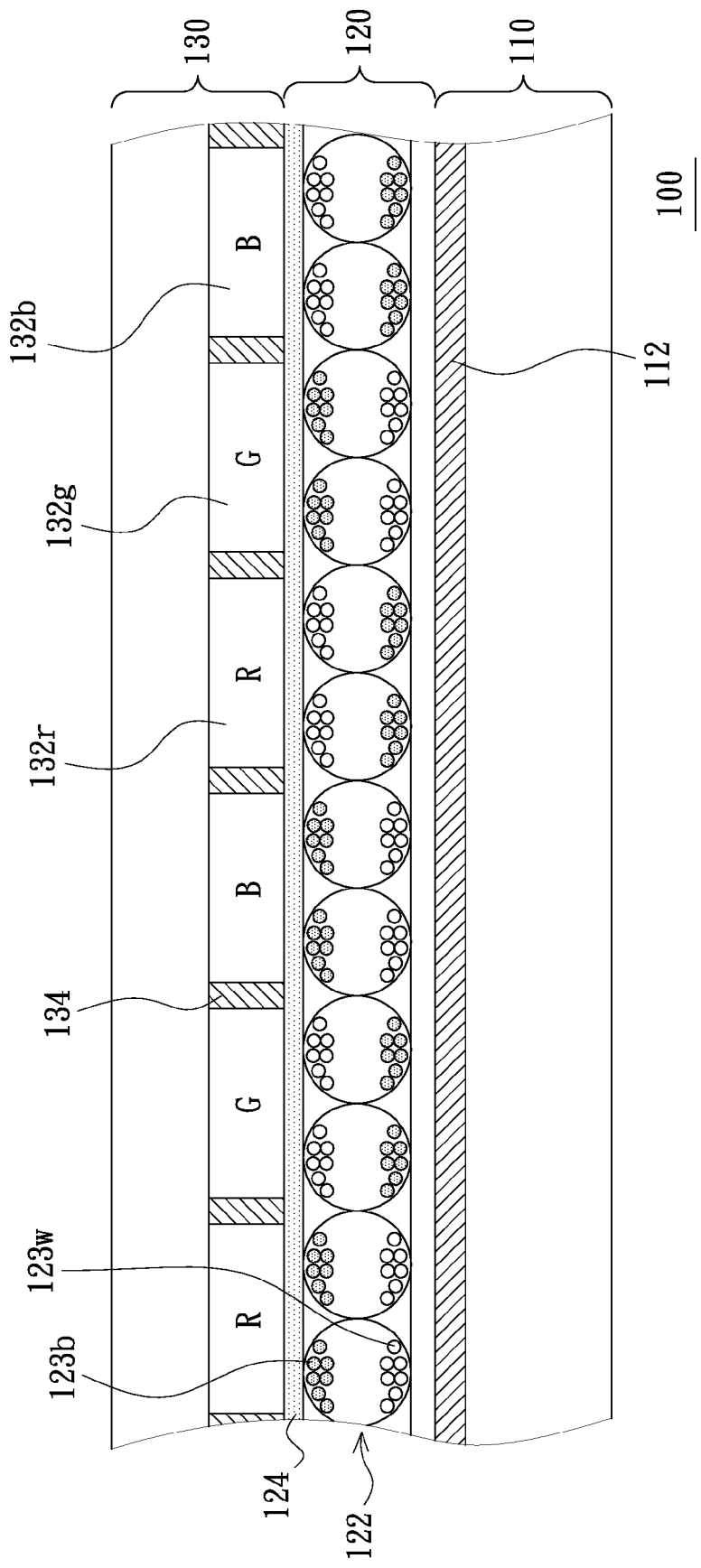
FIG. 1 is a schematic view of a conventional electrophoretic display apparatus.
Figure 2:
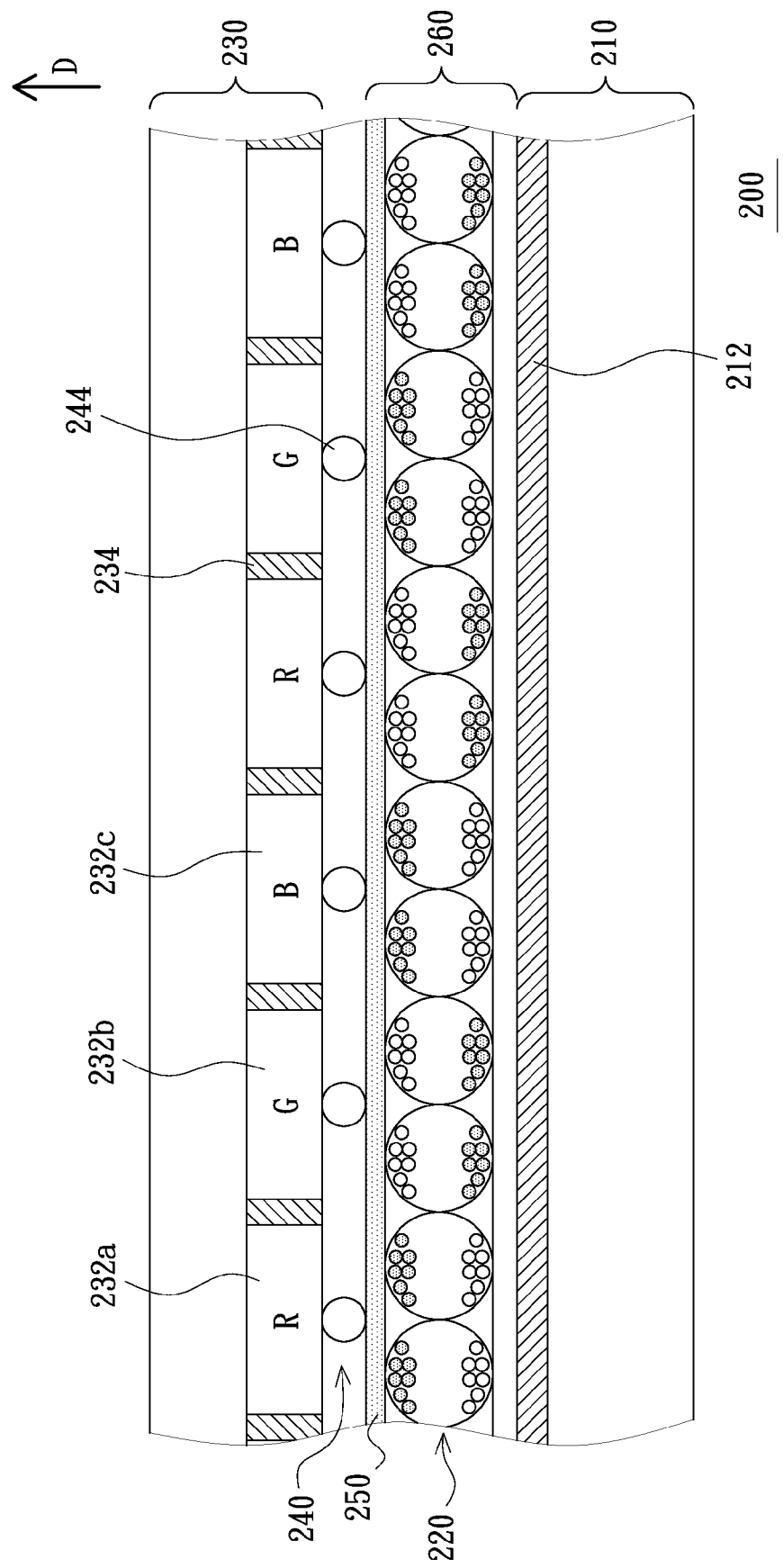
FIG. 2 is a schematic view of an electrophoretic display apparatus according to an embodiment of the present invention.

FIG. 2 is a schematic view of an electrophoretic display apparatus according to an embodiment of the present invention. Referring to FIG. 2, the electrophoretic display apparatus 200 of the present embodiment includes a bottom substrate 210, an electrophoretic layer 220, a color filter substrate 230 and a spacing layer 240. The bottom substrate 210 has a drive circuitry layer 212, and the electrophoretic layer 220 is disposed on the drive circuitry layer 212 of the bottom substrate 210. The color filter substrate 230 is disposed above the electrophoretic layer 220, and the spacing layer 240 is disposed between the color filter substrate 230 and the electrophoretic layer 220.

Material of the bottom substrate 210 can be stainless steel, metal alloy, polyimide (PI), polyethylene terephthalate (PET), polymethylmetacrylate (PMMA), polyethylene naphthalene (PEN) or other suitable material. Moreover, the drive circuitry layer 212 can includes a plurality of pixel electrodes (not shown in FIG. 2) and a plurality of switch elements (not shown in FIG. 2) such as thin film transistors (TFTs), wherein the switch elements are electrically connected to the pixel electrodes, respectively. In other words, the electrophoretic display apparatus 200 is, for example, an active electrophoretic display apparatus. The pixel electrodes can be transparent electrodes or metal electrodes such as silver electrodes, wherein material of the transparent electrodes can be indium tin oxide (ITO), indium zinc oxide (IZO), zinc oxide, indium gallium zinc oxide (IGZO) or other transparent electric conduction material.

The electrophoretic layer 220 shown in FIG. 2 is microcapsule type electrophoretic layer. That means the electrophoretic display apparatus 200 of the present embodiment is a microcapsule type electrophoretic display apparatus. Moreover, the electrophoretic layer 220 can be disposed in a front plane laminate 260. Further, the electrophoretic display apparatus 200 can further includes a transparent electrode layer 250 disposed on the electrophoretic layer 220. The transparent electrode layer 250 can be disposed in the front plane laminate 260, and material of the transparent electrode layer 250 can be ITO, IZO, zinc oxide, IGZO or other transparent electric conduction material.

The color filter substrate 230 includes a plurality of color photoresists, such as first color photoresists 232a, second color photoresists 232b and third color photoresists 232c. The first color photoresist 232a is, for example, red photoresist. The second color photoresist 232b is, for example, green photoresist. The third color photoresist 232c is, for example, blue photoresist. Colors of the first color photoresist 232a, the second color photoresist 232b and the third color photoresist 232c are not limited in the present invention. For example, in another embodiment, the colors of the first color photoresist 232a, the second color photoresist 232b and the third color photoresist 232c can be yellow, magenta and cyan, respectively. Furthermore, the color filter substrate 230 can further includes a black matrix 234 for separating the color photoresists 232a, 232b and 232c.

Figure 3:
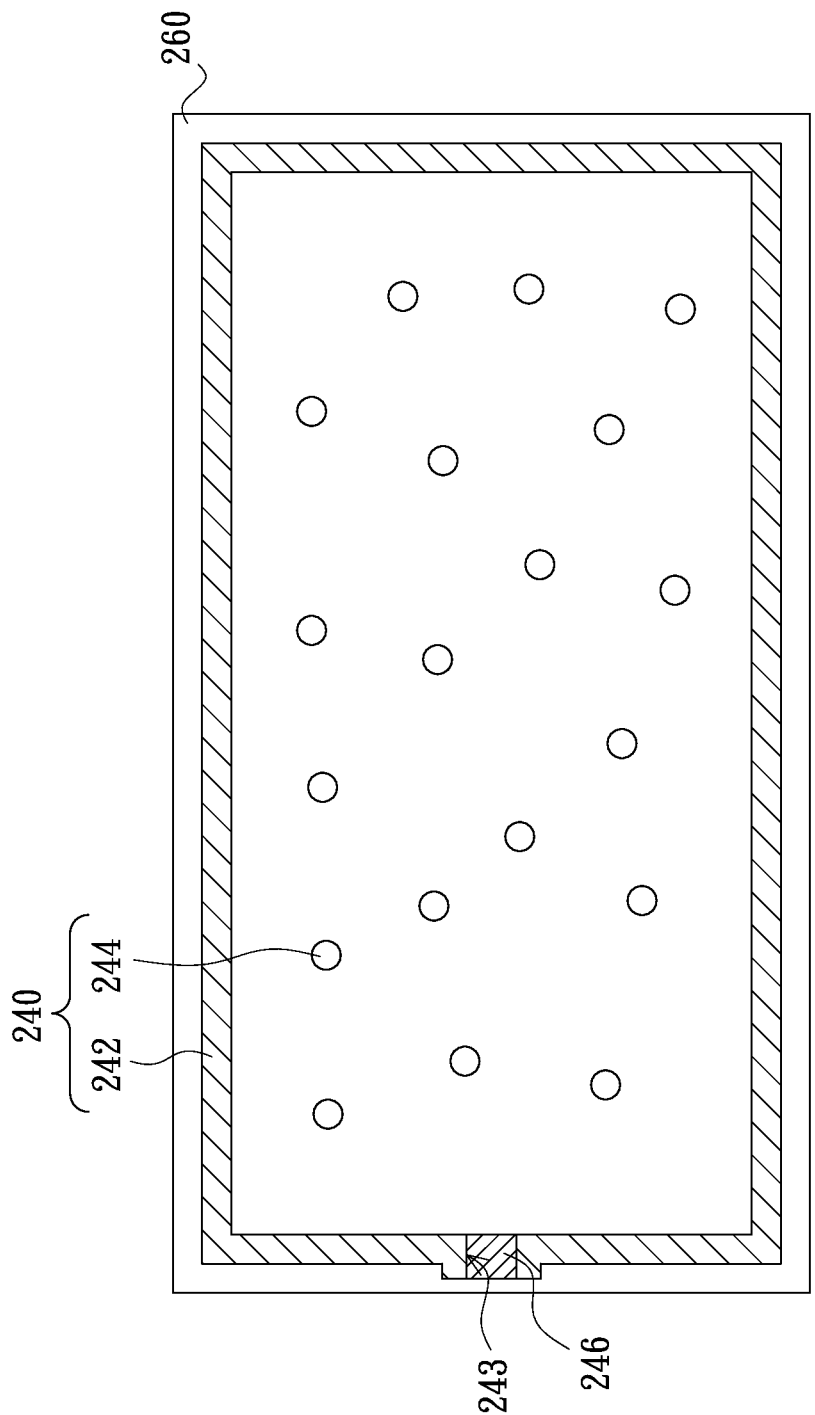
FIG. 3 is a schematic top view of the spacing layer of FIG. 2.

FIG. 3 is a schematic top view of the spacing layer of FIG. 2. Referring to FIGS. 2 and 3, in the present embodiment, the spacing layer 240 includes, for example, a sealant 242 and a plurality of spacers 244. The sealant 242 and the spacers 244 are used to maintain a gap between the color filter substrate 230 and the electrophoretic layer 220. In the present embodiment, the sealant 242 is, for example, spread on edges of the front plane laminate 260, and the spacers 244 are disposed in an area surrounded by the sealant 242. Moreover, the spacers 244 can have spherical shapes, pillar shapes or other shapes. The spacers 244 can include at least one of plastic spacers, glass spacers and silicon spacers. In other words, the spacers 244 can be the plastic spacers, the glass spacers, the silicon spacers or a combination thereof. Furthermore, lengths of the spacers 244 along a predetermined direction D are respectively between 1 micrometer and 7 micrometers, wherein the predetermined direction D points to the color filter substrate 230 from the bottom substrate 210.

In the present embodiment, when spreading the sealant 242, a breach 243 can be reserved in advance. After assembling the color filter substrate 230 with electrophoretic layer 220, a vacuum process can be performed through the breach 243 so as to eliminate air bubbles between the color filter substrate 230 and the electrophoretic layer 220 and further prevent non-uniform gap between the color filter substrate 230 and the electrophoretic layer 220. Moreover, after the vacuum process is performed, a sealing material 246 can be used to seal the breach 243.

Due to the electrophoretic display apparatus 200 of the present embodiment has the spacing layer 240, the vacuum process can be performed after the color filter substrate 230 being assembled with the electrophoretic layer 220, and therefore, air bubbles between the color filter substrate 230 and the electrophoretic layer 220 can be eliminated. This prevents the display quality of the electrophoretic display apparatus 200 from being reduced due to the air bubbles between the color filter substrate 230 and the electrophoretic layer 220 or prevents the yield of the electrophoretic display apparatus 200 from being reduced due to the air bubbles between the color filter substrate 230 and the electrophoretic layer 220. Therefore, the electrophoretic display apparatus 200 of the present embodiment has better display quality and yield.

It should be noted that although the electrophoretic display apparatus 200 of the present embodiment is the active electrophoretic display apparatus, in another embodiment, the electrophoretic display apparatus can be a passive electrophoretic display apparatus. That means that the drive circuitry layer and the transparent electrode layer respectively include a plurality of stripe electrodes. One skilled in the art can easily realize the detail structure of the passive electrophoretic display apparatus, and detail description about the passive electrophoretic display apparatus is omitted herein. Moreover, although the electrophoretic display apparatus 200 is a microcapsule type electrophoretic display apparatus, the electrophoretic display apparatus of the present invention also can be a microcup type electrophoretic display apparatus, a liquid powder display apparatus or other type electrophoretic display apparatus. Furthermore, although the electrophoretic display apparatus 200 is designed to have a top electrode layer (i.e. the transparent electrode layer 250) and a bottom electrode layer (i.e. pixel electrodes), in another embodiment, the electrophoretic display apparatus can be designed to have in-plane electrodes. That is to say that the above mentioned two electrode layers are disposed on the same plane.

Figure 4:
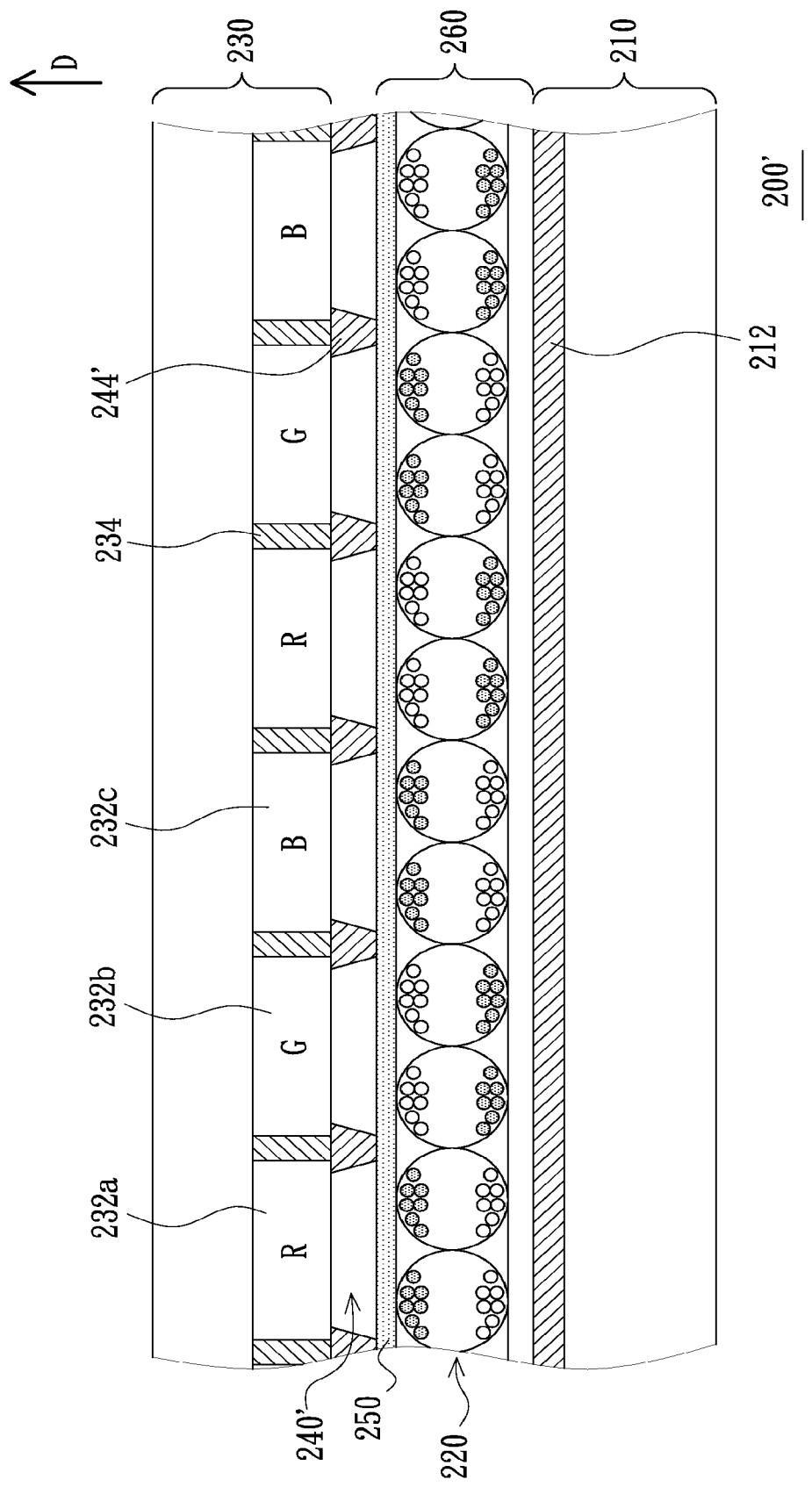
FIG. 4 is a schematic view of an electrophoretic display apparatus according to another embodiment of the present invention.

FIG. 4 is a schematic view of an electrophoretic display apparatus according to another embodiment of the present invention. Referring to FIG. 4, the electrophoretic display apparatus 200' of the present embodiment is similar to the electrophoretic display apparatus 200 of FIG. 2, and the difference is the spacing layers. More specifically, the spacers 244' of the spacing layer 240' of the electrophoretic display apparatus 200' of the present embodiment are, for example, formed at the color filter substrate 230. Material of the spacers 244' can be photo resin. Moreover, in the embodiment that material of the color photoresists 232a, 232b and 232c is photo resin, the spacers 244' and the photoresists 232a, 232b and 232c of the color filter substrate 230 can be formed at the same time.

Other advantages of the electrophoretic display apparatus 200' of the present embodiment are similar to that of the electrophoretic display apparatus 200 of FIG. 2, and detail description is omitted herein.

In summary, due to the electrophoretic display apparatus of the present invention having the spacing layer, the vacuum process for the spacing layer can be performed after the color filter substrate being assembled with the electrophoretic layer so as to eliminate the air bubbles between the color filter substrate and the electrophoretic layer. This prevents the display quality, or the yield, of the electrophoretic display apparatus from being reduced due to the air bubbles. Therefore, the electrophoretic display apparatus of the present invention has better display quality and yield.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An electrophoretic display apparatus, comprising:
a bottom substrate with a drive circuitry layer;
an electrophoretic layer disposed on the drive circuitry layer of the bottom substrate; and
a spacing layer, wherein the spacing layer comprises a sealant and a plurality of spacers disposed in an area surrounded by the sealant, and the sealant is disposed above the electrophoretic layer.

2. The electrophoretic display apparatus as claimed in claim 1, further comprising a color filter substrate, wherein the spacing layer is disposed between the color filter substrate and the electrophoretic layer.

3. The electrophoretic display apparatus as claimed in claim 2, wherein the spacers are formed at the color filter substrate.

4. The electrophoretic display apparatus as claimed in claim 1, further comprising a color filter substrate wherein the spacing layer is contacted with the color filter substrate.

5. The electrophoretic display apparatus as claimed in claim 4, wherein the color filter substrate is disposed above the electrophoretic layer.

6. The electrophoretic display apparatus as claimed in claim 1, wherein the spacers have spherical shapes or pillar shapes.

7. The electrophoretic display apparatus as claimed in claim 1, wherein material of the spacers comprises at least one of photo resin, plastics, glass and silicon.

8. The electrophoretic display apparatus as claimed in claim 1, further comprising a color filter substrate wherein lengths of the spacers along a predetermined direction are respectively between 1 micrometer and 7 micrometers, and the predetermined direction points to the color filter substrate from the bottom substrate.

9. The electrophoretic display apparatus as claimed in claim 1, further comprising a transparent electrode layer disposed between the electrophoretic layer and the spacing layer.

10. The electrophoretic display apparatus as claimed in claim 9, wherein the spacing layer is contacted with the transparent electrode layer.

11. The electrophoretic display apparatus as claimed in claim 1, being a microcapsule type electrophoretic display apparatus, a microcup type electrophoretic display apparatus or a liquid powder display apparatus.

12. A spacing layer of a display apparatus, comprising:
a sealant disposed above an electrophoretic layer of the display apparatus; and
a plurality of spacers disposed in an area surrounded by the sealant.

13. The spacing layer as claimed in claim 12, wherein the spacers have spherical shapes.

14. The spacing layer as claimed in claim 12, wherein the spacers have pillar shapes.

15. The spacing layer as claimed in claim 12, wherein material of the spacers comprises photo resin.

16. The spacing layer as claimed in claim 12, wherein the spacers comprise at least one of plastic spacers, glass spacers and silicon spacers.

17. The spacing layer as claimed in claim 12, wherein the spacers are disposed above the electrophoretic layer of the display apparatus.

* * * * *